(12) United States Patent
Zhuravlev

(10) Patent No.: US 11,100,656 B2
(45) Date of Patent: Aug. 24, 2021

(54) METHODS CIRCUITS DEVICES SYSTEMS AND FUNCTIONALLY ASSOCIATED MACHINE EXECUTABLE INSTRUCTIONS FOR IMAGE ACQUISITION IDENTIFICATION LOCALIZATION AND SUBJECT TRACKING

(71) Applicant: MEMOTIX CORP C, Tampa, FL (US)

(72) Inventor: Dmitry Zhuravlev, Moscow (RU)

(73) Assignee: MEMOTIX CORP C, Tampa, FL (US)

( * ) Notice: Subject to any disclaimer, the term of this patent is extended or adjusted under 35 U.S.C. 154(b) by 0 days.

(21) Appl. No.: 16/527,094

(22) Filed: Jul. 31, 2019

(65) Prior Publication Data

US 2021/0035312 A1   Feb. 4, 2021

(51) Int. Cl.
| | |
|---|---|
| *G06K 9/00* | (2006.01) |
| *G06T 7/292* | (2017.01) |
| *G06K 9/46* | (2006.01) |
| *G06K 9/62* | (2006.01) |
| *H04N 7/18* | (2006.01) |

(Continued)

(52) U.S. Cl.
CPC ............. *G06T 7/292* (2017.01); *G06F 16/29* (2019.01); *G06F 16/532* (2019.01); *G06F 16/587* (2019.01); *G06K 9/46* (2013.01); *G06K 9/6201* (2013.01); *G06K 9/6267* (2013.01); *H04N 5/23299* (2018.08); *H04N 7/18* (2013.01); *G06T 2200/24* (2013.01)

(58) Field of Classification Search
CPC .................................................... G06T 7/292
See application file for complete search history.

(56) References Cited

U.S. PATENT DOCUMENTS 10,606,824 B1 *  3/2020  Fire ....................... H04W 4/021
2012/0166074 A1   6/2012  Weng et al.
(Continued)

FOREIGN PATENT DOCUMENTS

IL        238262 B      11/2015

*Primary Examiner* — Oneal R Mistry
(74) *Attorney, Agent, or Firm* — Seckel IP, PLLC

(57) ABSTRACT

Disclosed are computerized methods and systems for providing digital image data in which there appears a captured instance of a point of interest located within a coverage area of the systems. Exemplary systems may include at least one image repository gateway for accessing one or more image data repositories which may store digital image data of images and videos acquired from within the system coverage area. The system may also include an image scanning engine to search through and access image data from the one or more image data repositories in accordance with an image data search query, selecting stored images and videos with geolocation tags indicating a location within a spatial distance of a location parameter of the image date query. The system may perform image searches and retrievals based on manually defined search queries. The system may also include an Image search query generator configured to auto-generate an image data search query to find a moving subject appearing in a previously retrieved image, wherein the image data search query for finding and or tracking may be based on an auto-predicted route of the subject derived from a previously retrieved or selected image.

26 Claims, 7 Drawing Sheets

(51) Int. Cl.
*G06F 16/29* (2019.01)
*G06F 16/587* (2019.01)
*G06F 16/532* (2019.01)
*H04N 5/232* (2006.01)

(56) References Cited

U.S. PATENT DOCUMENTS

2019/0259182 A1* 8/2019 Sarukkai ............ G06K 9/00791
2020/0401617 A1* 12/2020 Spiegel ................ G06F 16/587

* cited by examiner

METHODS CIRCUITS DEVICES SYSTEMS AND FUNCTIONALLY ASSOCIATED MACHINE EXECUTABLE INSTRUCTIONS FOR IMAGE ACQUISITION IDENTIFICATION LOCALIZATION AND SUBJECT TRACKING

FIELD OF THE INVENTION

The present invention generally relates to the field of imaging and image processing. More specifically, the present invention relates to methods, circuits, devices, systems, networks and functionally associated machine executable code for image acquisition, identification, localization and tracking.

BACKGROUND

Video surveillance of the public using CCTV is common in many areas around the world. In recent years, the use of body worn video cameras has been introduced as a new form of surveillance, often used in law enforcement, with cameras located on a police officer's chest or head. CCTV systems may operate continuously or only as required to monitor a particular event. A more advanced form of CCTV, utilizing digital video recorders (DVRs), provides recording for possibly many years, with a variety of quality and performance options and extra features (such as motion detection and email alerts). More recently, decentralized IP cameras, perhaps equipped with megapixel sensors, support recording directly to network-attached storage devices, or internal flash for completely stand-alone operation.

There are about 350 million surveillance cameras worldwide as of 2016. Additionally, the number of mobile networked imaging devices, such those cameras embedded in smartphones, has grown to more than 3 billion as of 2018. Over 95 million photos and videos are captured and shared on Instagram daily. It is estimated that over 6 trillion photos are stored online. The sheer number and pace of growth of photo and video content available online is astonishing.

Searching through this enormous and rapidly growing pool of image content for some specific content is a daunting task. Fortunately, digital imaging devices have adopted the use of metatags for acquired image, wherein metadata is embedded within an acquired and saved image file which may include information such as image capture geolocation, time, date, camera orientation, and various camera parameters. Additionally, some online image repositories have started using computer vision based image feature extraction tools to classify images based on content within the image and to add content image related information to the stored image file, either as metatags in the image file, encoded within the name of the image file and/or or as fields of one or more database records associated with the image file.

Searchable live image/video feeds, public and private, are usable for locating and/or identifying objects, persons, events and other possible points of interest. With life image/video feeds, live tracking of people and other moving objects is possible. Video tracking is the process of locating an moving object (or multiple objects) over time using a camera. It has a variety of uses, some of which are: human-computer interaction, security and surveillance, video communication and compression, augmented reality, traffic control, medical imaging and video editing. Video tracking can be a time consuming process due to the amount of data that is contained in video, Adding further to the complexity is the possible need to use object recognition techniques for tracking, a challenging problem in its own right.

Searchable image/video repositories, public and private, are usable for forensically locating and/or identifying objects, persons, events and other possible points of interest. This process is even more complicated and time consuming than the live video tracking describer above due to the unstructured nature of stored images randomly taken by different people or devices at different times. There is a need in the field of image processing and searching for improved methods, circuits, devices systems and associated machine executable instructions for image acquisition, identification, localization and tracking.

SUMMARY OF INVENTION

The present invention may include methods, circuits, devices, systems, networks and functionally associated machine executable instructions for image acquisition, localization and tracking. Embodiments of the present invention may include an image search and processing system with access to a set of image databases and optionally to a set of camera feeds from various cameras distributed across a designated coverage area. The search and processing system may be connected to a distributed heterogeneous network of cameras, fixed and/or mobile, which may be dispersed across the system's coverage area. The network of cameras and the image databases to which network cameras store captured images may be accessed and utilized for purposes of acquiring image information from one or more scenes including one or more points of interest within the coverage area of the camera network.

Points of interest according to embodiments of the present invention may either be static or dynamic points of interest. A point of interest according to embodiments of the present invention may be static or fixed, such as in the case of a monument, a statue, a building, a park, a street or an intersection of streets. Static or fixed points of interests are immobile and thus may be designated by either a specific address, geo-coordinates, a designation of a known landmark and/or any other location designator used today or to be devised in the future.

Points of interest according to further embodiments of the present invention may be dynamic points of interest, such as in the case of a person, a bike or a car, either moving or stationary. A dynamic point of interest may be associated with one or more defined entities, such as for example a specific individual, various people with specific visual attributes, a specific vehicle or a set of vehicles with a specific visually detectable characteristic. A dynamic point of interest may be either moving or may be stationary at different times. Dynamic points of interest may be located and tracked, when moving, within a system coverage area by generating an image query for the dynamic point of interest, wherein the image query may include either visual characterization information for the dynamic point of interest and or may include a sample image of the dynamic point of interest. The query may be submitted to an image search and processing system according to embodiments of the present invention, which system may use the query to search through one or more image data bases and one or more camera feeds from the distributed network of heterogamous cameras, specifically for captured images including the dynamic point of interest, which images were captured either currently or at some point in the past. The query for the dynamic point of interest may also include relevant time and location range constraints for which captured images, including the dynamic point of interest are relevant for the respective search, tracking and or localization task. The query may include a relevant starting time and location constraint for which captured images including the query identified dynamic point of interest are relevant for the respective search, tracking and or localization task.

According to embodiments of the present invention, a distributed heterogeneous network of cameras may include both fixed, controllable and or mobile cameras, which camera may be accessed and utilized for purposes of finding images of a specific subject or subjects of a specific category with specific visibly assessable attributes. According to some embodiments, the steps of "access and utilize" may be limited to simply gaining access to image data, along with associated metadata, captured by each of a set of cameras of the distributed network during normal operation of those cameras. According to further embodiments, the steps of "access and utilize" may also include gaining operational control of each of a set of cameras on the distributes network so as to adjust each camera's respective position, orientation and resulting field of view. The step of "utilization" may include the use of computerized image feature extraction, feature matching and or classification for purposes of finding an instance of the subject or subjects within the camera acquired image data.

Embodiments of the present invention may include image scene localization based on a combination of metadata and "anchor feature" identification. Embodiments of the present invention may include image based subject direction, trajectory or course (future path) prediction using a combination on image/video extracted information such as: (a) subject motion vector(s), (b) subject classification (e.g. person, bike, car, etc.), (c) nearby traffic patterns, and (d) nearby traffic conditions. Even further embodiments of the present inventions may utilize subject trajectory estimation to optimize camera network access patterns for surpasses of tracking a subject across a coverage area of the camera network.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
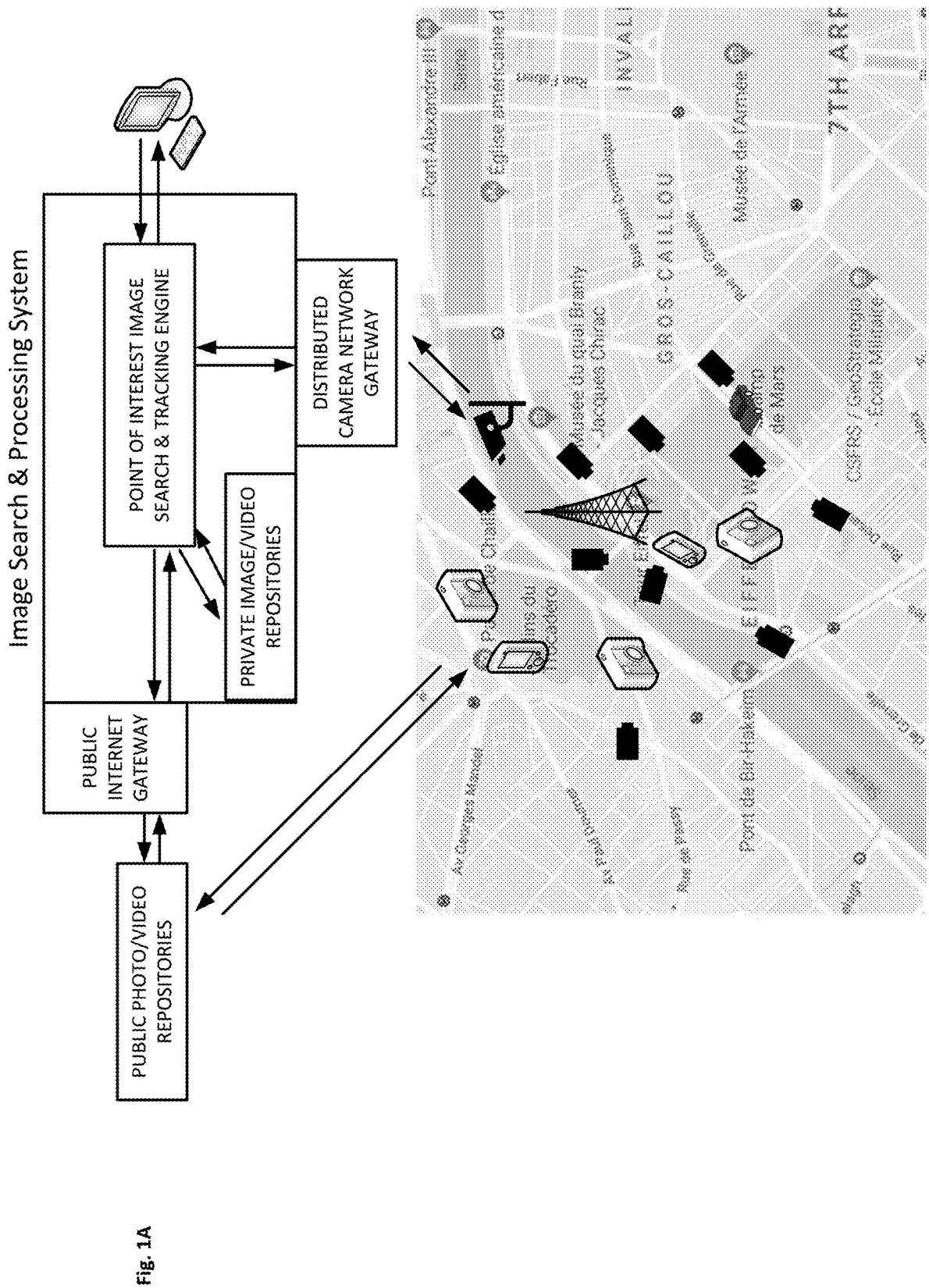
FIG. 1A shows a system level diagram of an image search and processing system according to exemplary embodiments of the present invention, wherein the system includes gateways to both public and private image databases or repositories and a gateway to a digital camera network with cameras dispersed around at least part of a coverage area of the system, such as for example a town or city.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE FIGURES

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like. Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), any composition and/or architecture of semiconductor based Non-Volatile Memory (NVM), any composition and/or architecture of biologically based Non-Volatile Memory (NVM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other functionally suitable components may be used.

Turning now to FIG. 1A, there is shown a system level diagram of an image search and processing system according to exemplary embodiments of the present invention, wherein the system includes gateways to both public and private image databases or repositories and a gateway to a digital camera network with cameras dispersed around at least part of a coverage area of the system, such as for example a town or city. The system includes a point of interest image search and tracking engine to identify, and optionally retrieve, from within the repositories and or camera feeds, images or video image data within which appear designated points of interest.

The images to be identified and/or retrieved by the point of interest image search and tracking engine may also be constrained by the location and or the time the images were captured, wherein the constraints may be defined within a search query generated by either the user or by the system itself. A point of interest in accordance with embodiments of the present invention may be a static point of interest such as a specific location designated by address, geolocation coordinates or landmark name. A point of interest in accordance with further embodiments may be a dynamic point of interest such as a person or vehicle, or a class of persons or vehicles.

Dynamic points of interest may be moving or still at different points in time. A dynamic point of interest may also be referred to as "a subject", which subject may be designated within an image search query generated by a user or generated by a tracking engine of a system in accordance with embodiments of the present invention.

Figure 1B:
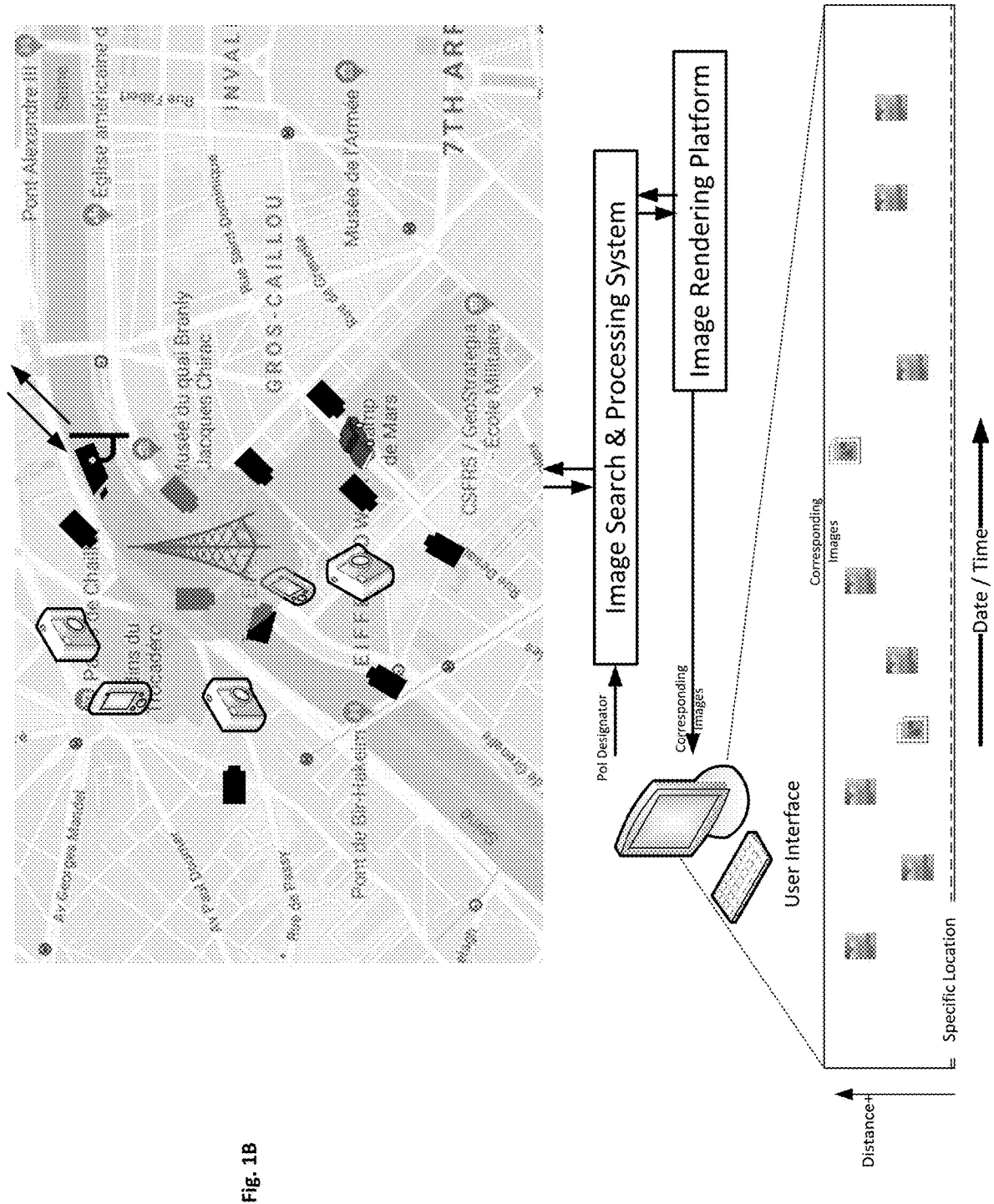
FIG. 1B shows a system level illustration of an image search and processing system, such as for example the one shown in FIG. 1A, including a computerized user interface for facilitating the authoring and submission of search queries to search system accessible image repositories and/or camera feeds for images or videos which captured and include an instance of a point of interest defined in the query, optionally during some query defined period of time and or within some predefined distance from the point of interest.

Turning now to FIG. 1B, there is shown a system level illustration of an image search and processing system, such as for example the one shown in FIG. 1A, including a computerized user interface for facilitating the authoring and submission of image search queries to search system accessible image repositories and/or camera feeds for images or videos which captured and include an instance of a point of interest defined in the query. The designated point of interest may be static, such as an address or a landmark. The designated point of interest may be dynamic, such as a specific person or specific vehicle, or a class of persons or vehicles. Optionally some image queries may constrain the search to specific periods of time and or some predefined distance from a designated point of interest, static or dynamic.

The system of FIG. 1B also includes, as part of its user interface, a rendering engine to display images selected, retrieved and or otherwise received by the system in accordance with specific image data queries generated by a user and or by a logical element of the system, such as a tracking engine. The images may be rendered and displayed according to various arrangements, including within a multi-axis graph, or a framed graph, wherein the x-axis may designate time and the y-axis may designate distance from a location, such as the location of a static point of interest. According to the example of FIG. 1B, the system rendering engine is placing/rendering retrieved images of a static point of interest (e.g. the Eiffel tower of Paris) captured during a specific range of times (e.g. Jun. 1, 2018).

The location of a specific image on the y-axis of the display framed graph indicates a distance from the location of the designated static point of interest from which the image was captured. While the location of a specific image on the y-axis indicates the specific time with the range of times designated in the image search query which resulted in the retrieved set of images. Illustrated in FIG. 3B is an optional extension of the user interface according to embodiments of the present invention, wherein a user viewing a set of images resulting from a first image query for images of a static point of interest during a designated period of time (e.g. Eiffel tower on Jul. 22, 2019) may designate within one of the retrieved images a dynamic point of interest or "subject" (e.g. a red car) for the system to track and or localize within its coverage area. According to some embodiments, the coverage area of a system may be extended based on predictions of where the dynamic point of interest or subject will be at some point in the future, wherein the predictions may be based on subject features, such as subject location, subject type and subject trajectory, extracted from one or more previously retrieved or received images or videos.

Figure 2:
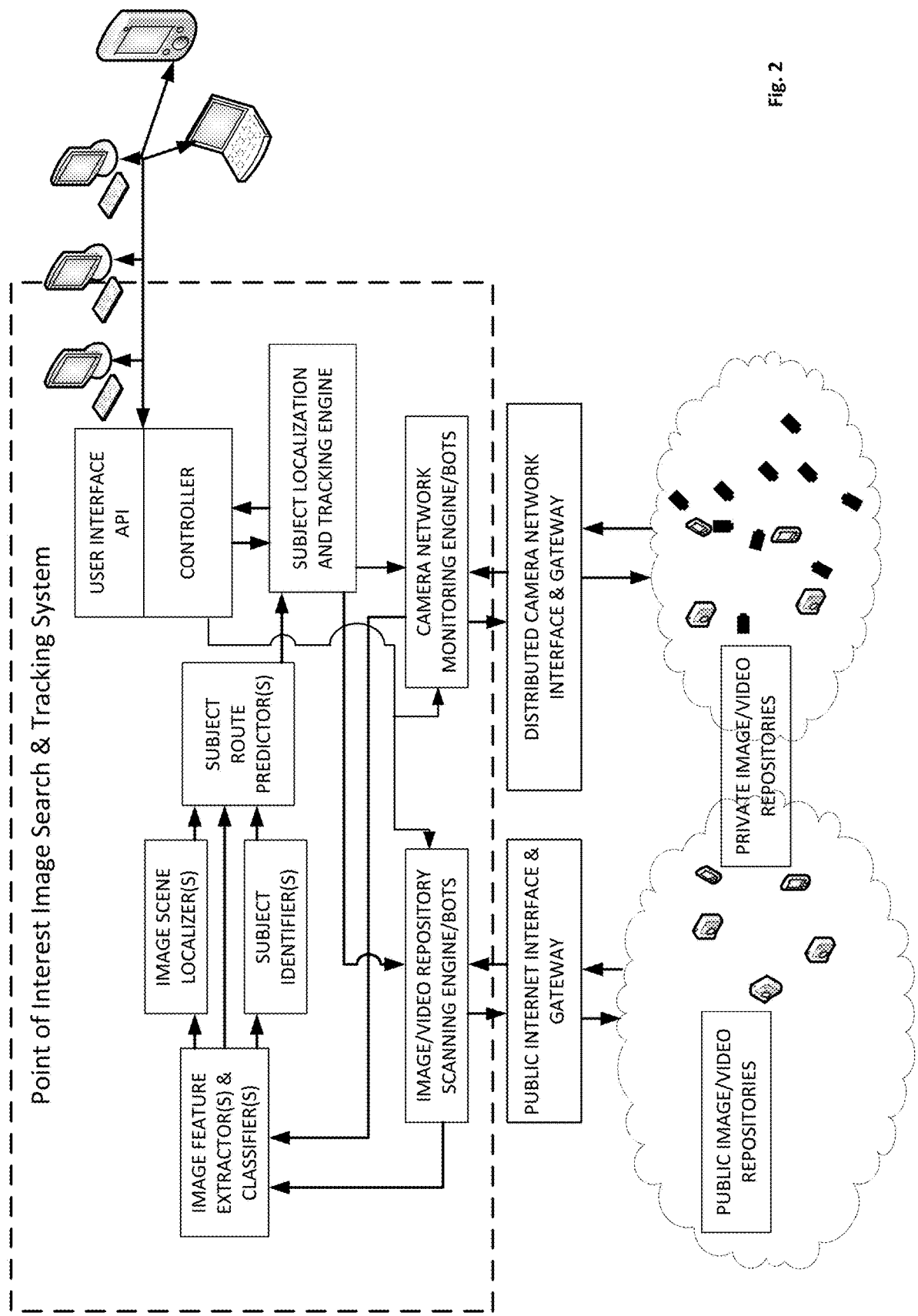
FIG. 2 shows a system level block diagram of an exemplary point of interest image search and tracking platform according to exemplary embodiments of the present invention wherein the point of interest defined in a query and for which images are sought may be static points of interest or dynamic points of interest. The exemplary platform includes: (a) Image Feature Extractors; (b) Image Feature Classifiers; (c) Subject Identifiers; (d) Image Scene Localizers; (e) Subject Route Predictors; (f) Interfaces to Distributed Camera Network; (g) Interfaces to Distributed Image Repositories; (h) Subject Localization and Tracking Engine; and (i) a System Controller Functionally Associated With a Human Machine Interface(s)

Turning now to FIG. 2, there is shown a system level block diagram of an exemplary point of interest image search and tracking system according to exemplary embodiments of the present invention, wherein the points of interest defined in a query for which images are sought may be static points of interest or dynamic points of interest. The exemplary system includes: (a) Image Feature Extractors; (b) Image Feature Classifiers; (c) Subject Identifiers; (d) Image Scene Localizers; (e) Subject Route Predictors; (f) Interfaces to Distributed Camera Network; (g) Interfaces to Distributed Image Repositories; (h) Subject Localization and Tracking Engine; and (i) a System Controller Functionally Associated With a User (Human Machine) Interface(s).

Figure 3A:
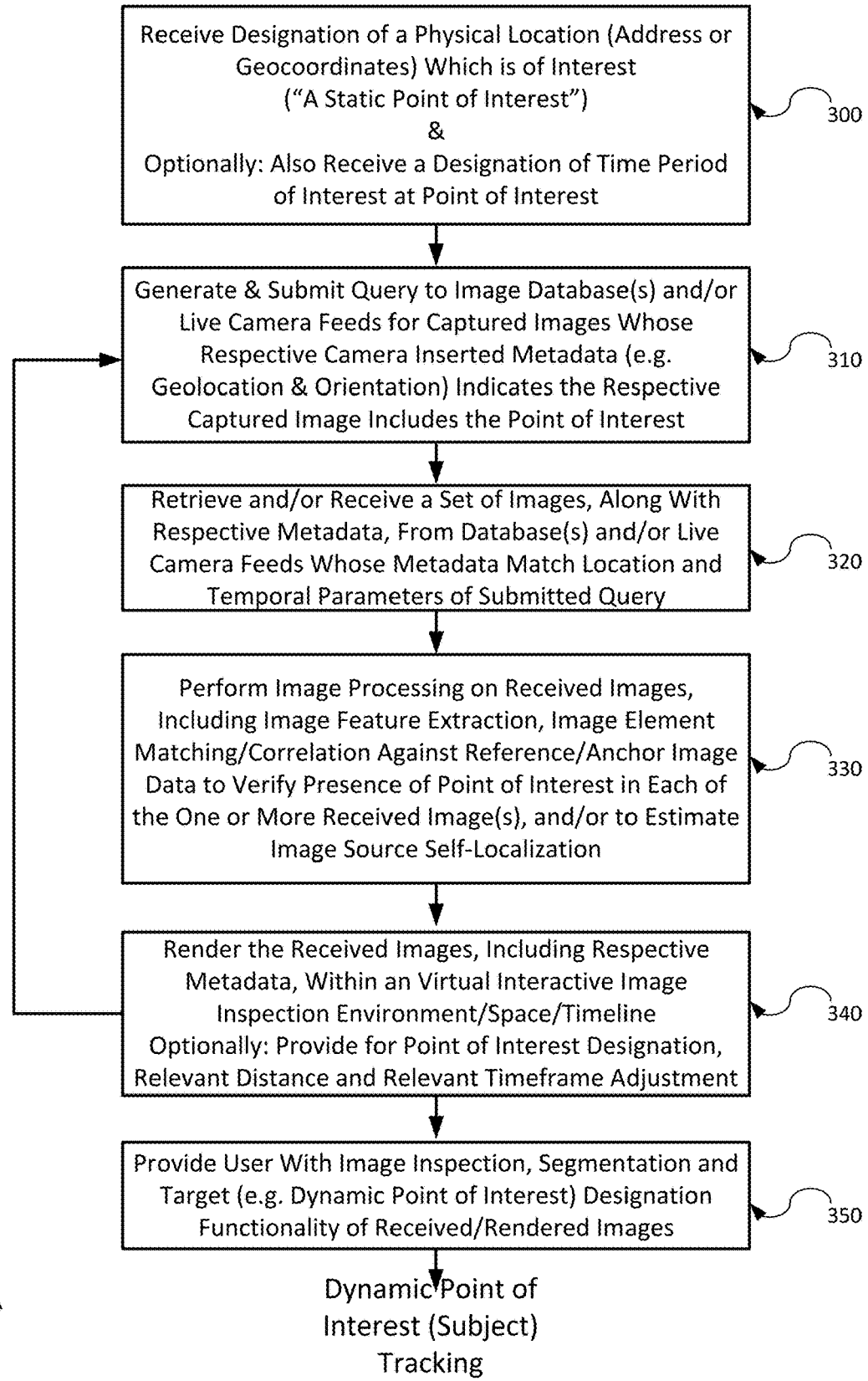
FIG. 3A is a flow chart including steps of an exemplary processes executed by a computerized image search system according to embodiments of the present invention intended to find and render images of a specific static point of interest located within a coverage area of the system, and wherein optionally the image search query also includes time, date and distance range constraints.
Figure 3B:
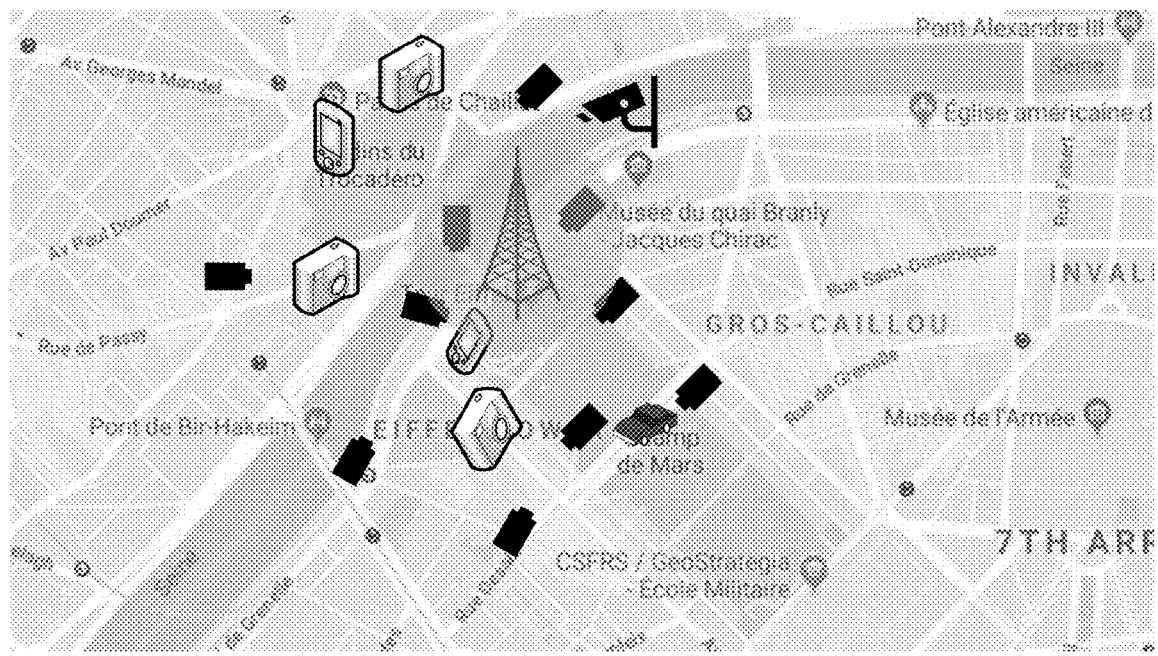
FIG. 3B is an illustration of an exemplary rendering according to embodiments herein image search results from a static point of interest query and search are rendered and placed within a two dimensional reference display frame wherein positioning of an image within the frame corresponds to: (a) a relative distance between the image point of capture and the query defined point of interest; and (b) a relative time/date of capture within the query defined time/date range, and wherein dynamic points of interest appearing within any of the displayed images can be user designated to become part of another image query for additional images of the dynamic point of interest either in the accessible repositories and/or within one or more accessible camera feeds.
Figure 3B:
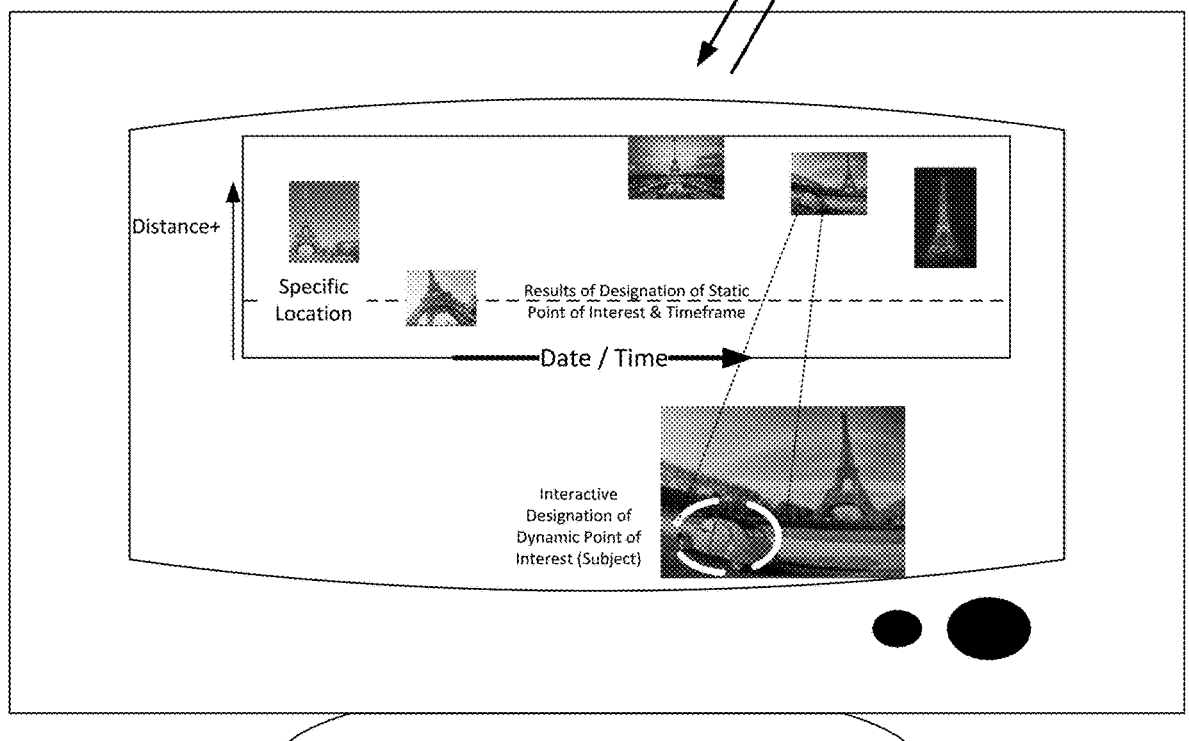

Some of the operations of this system may be at least partially described in conjunction with the steps of the exemplary method whose steps are illustrated in FIG. 3A, which is a flow chart including steps of an exemplary processes executed by a computerized image search system or platform according to embodiments of the present invention intended to find, and optionally render, images of a specific static point of interest located within a coverage area of the system, and wherein optionally the image search query also includes time, date and distance range constraints. According to the embodiments of FIGS. 2 & 3A, the user interface receives from a user a designation of a physical location such as an address, geocoordinates or landmark name which is of Interest (i.e. "A Static Point of Interest") to the user (Step 300). Optionally, the received designation also includes a time period of interest, or date/time range constraints, for which images of the Point of Interest are sought. The received static point of interest designation may be in the format of an image data search query, which query may be parameter based (e.g. user provide a location indicator and date/time range) and/or may be exemplary in nature (i.e. user provides a picture of a street or landmark as an example of the static point of interest).

The received image data search query is, parsed and structured if needed by the controller, and forwarded to: (a) the respiratory scanning engine, and (b) camera network monitoring engine (Step 310). The scanning and monitoring engines search for and retrieve and/or receive a set of images, along with respective metadata, from their respective database(s) and/or live camera feeds whose metadata match location and temporal parameters of the submitted query (Step 320). The resulting images are provided to image feature extractors and classifiers which perform image processing on the retrieved and received images. Image processing includes image feature extraction, image element matching/correlation against reference/anchor/example images or image data to find or verify presence of designated point of interest in each of the one or more received image(s). Image processing and feature matching may also be used to estimate image source (i.e. camera) positioning & orientation (i.e. camera self-localization) (Step 330) of respective images.

Retrieved and processed images are rendered by the user interface (Step 340). Rendering may be in many formats and arrangements including the one describer for FIG. 1B. The user interface may also provide the user with the option to mark or designate within one or more of the retrieved images some person or vehicle which the user wishes to designate as a specific dynamic point of interest or specific subject for tracking (Step 350). According to further embodiments, the user may mark a specific person or vehicle or other moving target as an example of a type or class of subjects for which the user wishes to find images. FIG. 3B is an illustration of an exemplary rendering according to embodiments wherein image search results from a static point of interest query and search are rendered and placed within a two dimensional reference display frame wherein positioning of an image within the frame corresponds to: (a) a relative distance between the image point of capture and the query defined point of interest location; and (b) a relative time/date of capture within the query defined time/date range, and wherein dynamic points of interest appearing within any of the displayed images can be user designated to become part of another image query for additional images of the dynamic point of interest either in the accessible repositories and/or within one or more accessible camera feeds.

Figure 4A:
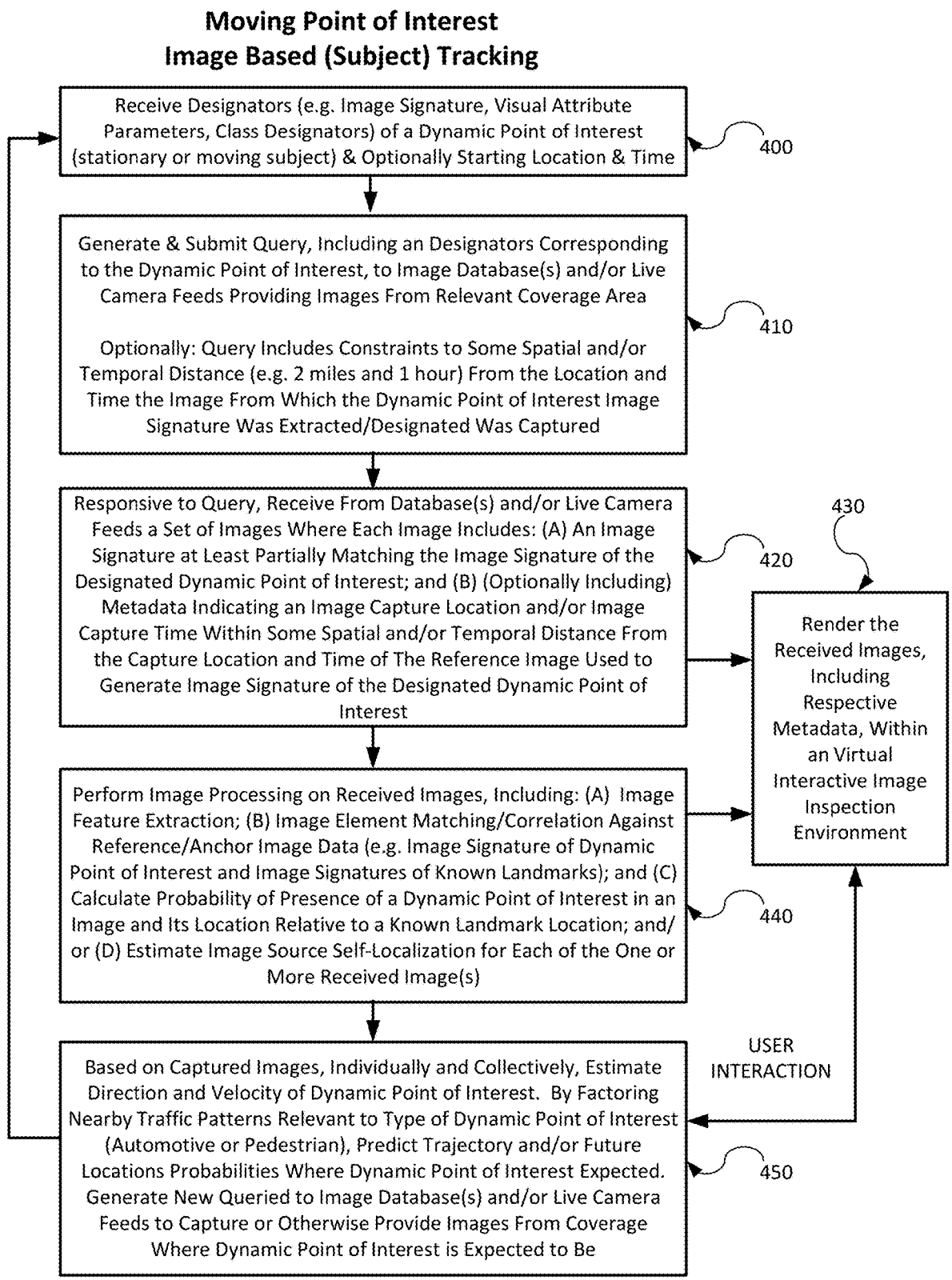
FIG. 4A is a flow chart including steps of an exemplary processes executed by a computerized image search system according to embodiments of the present invention intended to find and render images of a specific dynamic point of interest located and possibly moving within a coverage area of the system, such that the resulting images can be organized and presented for purposes of live tracking of a subject, who is the dynamic point of interest, within a coverage area of a distributed network of cameras or for purposes of forensic reconstruction of a route taken by the subject through a coverage area of a distributed network.

Turning now to FIG. 4A, there is shown a flow chart including steps of exemplary processes executed by a computerized image search system according to embodiments of the present invention intended to find and render images of a specific dynamic point of interest (subject) located and possibly moving within a coverage area of the system, such that the resulting images can be organized and presented for purposes of live tracking of a subject, who is the dynamic point of interest, within a coverage area of a distributed network of cameras or for purposes of forensic reconstruction of a route taken by the subject through a coverage area of a distributed network. The steps of this flow charter may be described in the context of the system of FIG. 2, wherein the image feature extractor, subject identifier, image scene localizer, subject route predictor and subject localization & tracking engine work together to retrieve or receive, from repository or camera feeds, relevant images wherein a designated dynamic point of interest appears. As an over, the image feature extractor is functionally associated with the subject route predictor and a subject localization engine configured to identify from within selected images one or more subjects of interest, predict a route of the one or more identified subject of interest, and to generate a follow up image data query with time and location search parameters calculated based on the predicted route(s).

More specifically, once a user designates through the user interface, either by marking an example in an already retrieved image or by providing search parameters, a dynamic point of interest (Step 400), the localization and tracking engine auto-generate a image data search for images in the repositories and or camera feeds including the appearance of the designated points or points of interest (Step 410). The image data search query may include visual cue search parameters for points of interest which are either specific persons or vehicles (specific subjects), or a specific class/type of persons or vehicles, subjects with some common user identified attributes which is are visually detectable.

The image data search query may also include a location and time where the dynamic point/subject of interest was imaged, thereby providing a starting reference for the tracking searches to be performed to track movement and location of the designated dynamic point(s) of interest. The tracking engine can generate & submit a query, including an image signature corresponding to the designated dynamic point of interest (i.e. subject which is either still or a moving target), to image database(s) and/or live camera feeds providing images from relevant coverage areas. Optionally, the tracking query may include constraints to some spatial and/or temporal distance (e.g. 2 miles and 1 hour) from the capture location and time of the reference image from which the target image signature was extracted/designated.

Response to the generated tracking query, camera feed images and/the database imaged are scanned (Step 420) for: (A) an Image signature at least partially matching an image signature matching that of the designated dynamic point of interest; and (B) metadata indicating an image capture location and/or image capture time within some spatial and/or temporal distance from the capture location and time of a reference image used to generate image signature of the designated dynamic point of interest (i.e. subject—moving or still). Images with features identified to match tracking query parameters, at least partially, are retrieved from the repository and or received from the camera feeds.

(Step 440) Image processing feature extractors perform image processing on retrieved and/or received images, wherein the processing includes: (A) image feature extraction; (B) image element matching/correlation against reference/anchor image data (e.g. image signature of dynamic points of interest and or image signatures of known landmarks); and (C) calculate probability of presence of a dynamic point of interest (subject) in an image and the location of the subject relative to a known landmark location; and/or (D) estimate image source self-localization for each of the one or more received image(s). A tracked subject's extracted features from captured images, individually and collectively (e.g. video) captured, are used to facilitate estimation of direction and velocity of the tracked subject within its location at a given time. By factoring nearby traffic patterns at the time a source image is captured, as related to the type of moving subject (e.g. Automotive or Pedestrian) being tracked, the subject's trajectory and/or future location probabilities (predicted route) map, where the subject can be expected in the future with what probability, may be estimated, predicted or generated (e.g. operation of the subject route predictor in FIG. 2).

(Step 450) A subject's predicted route or routes, estimated based on features of the subject extracted from received or retrieved images of the subject, are used to generate one or more follow-up tracking queries for images within which the subject (i.e. moving point of interest) may appear. The follow-up image data search queries may include the same or enhanced subject attribute designator (e.g. visual signatures) and spatiotemporal constraints corresponding to the subject's predicted routes.

One example for such a "predicted route(s)" based spatiotemporal constraint on images searches could be, for example: the tracked subject is a car identified in an image taken at point A at exactly 1 pm is estimated to be heading north at 30 Kilometers per hour on a clear open road which goes straight for 20 kilometers and which branches to the right every 2 kilometers. The follow-up tracking image query for images captured 1 minute or less after 1 pm will probably not include any locations further than 0.5 to 1 kilometer from point A. Follow-up tracking image queries according to this example for images captured 4 minutes after 1 pm will probably include locations between 1.5 and 2.5 kilometers away from point A on the main road and on either one or two branches off the main road. Use of route prediction in generating image data search queries for images with moving subject or points of interest being tracked optimizes and reduces processing load for repository and camera feed scanning for the tracked subject.

Figure 4B:
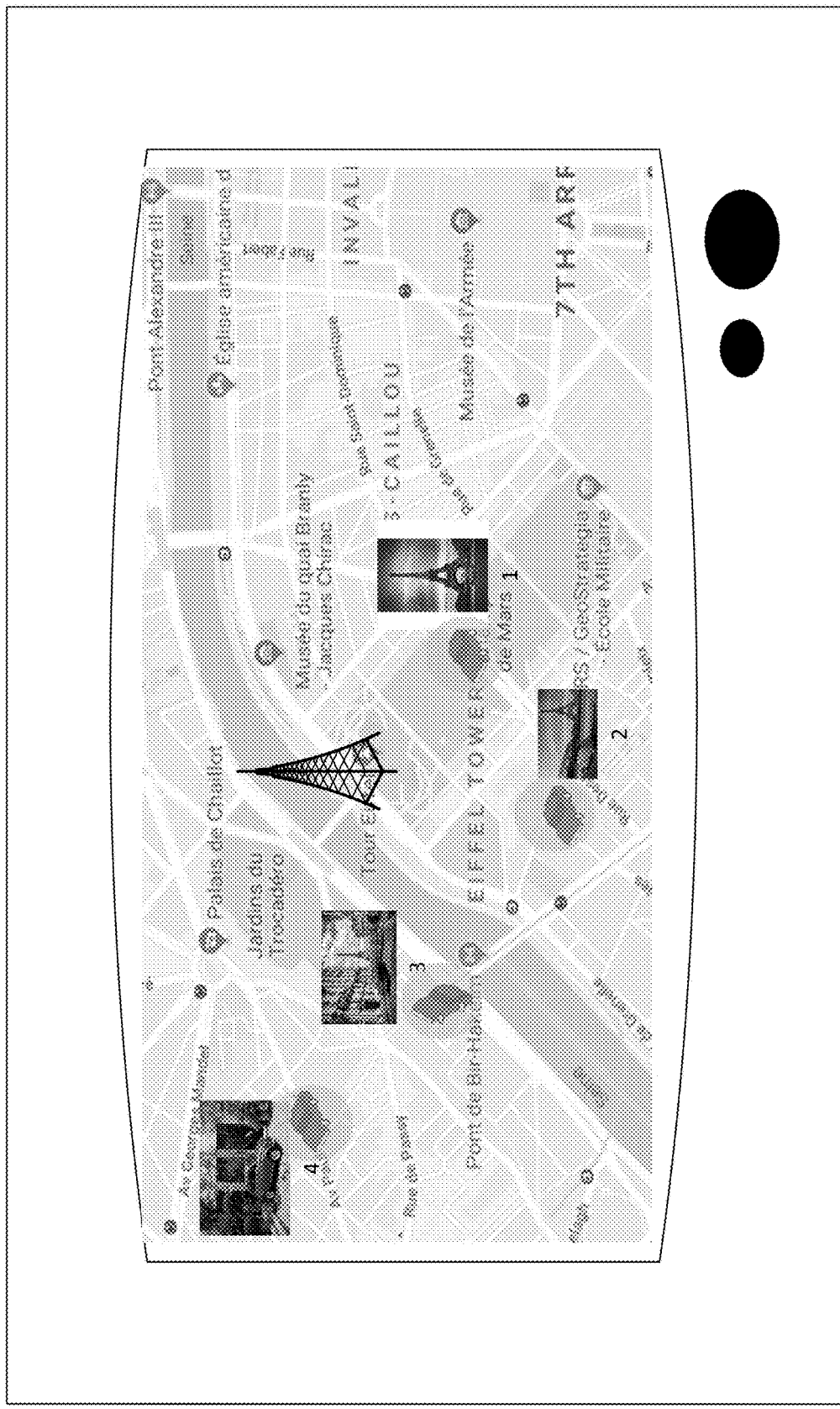
FIG. 4B is an illustration of an exemplary rendering according to exemplary embodiments wherein resulting image search results are organized and displayed on a map for purposes of live tracking of a subject, who is the dynamic point of interest or for purposes of forensic reconstruction of a route taken by the subject through a coverage area of a distributed network.

(Step 430) Images identified as showing a tracked subject are retrieved/received and rendered, including optionally respective metadata, within a virtual interactive image inspection environment. FIG. 4B is an illustration of an exemplary rendering according to exemplary embodiments wherein image search results from a search query for a dynamic point of interest (subject) are organized and displayed on a map for purposes of either live or forensic tracking of the subject. Images identified within a camera feed and placed on the mapped immediately are useful for live tracking the subject, which those images retrieved post-facto from a repository are useful for purposes of forensic reconstruction of a route taken by the subject through a coverage area of a distributed network.

The processes and displays presented herein are not inherently related to any particular computer, device, system or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Functions, operations, components and/or features described herein with reference to one or more embodiments, may be combined or otherwise utilized with one or more other functions, operations, components and/or features described herein with reference to one or more other embodiments, or vice versa. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A system for providing digital image data in which there is visible a captured instance of a point of interest located within a coverage area of the system, said system comprising:
   at least one image repository gateway for accessing one or more image data repositories which store digital image data of images and videos acquired from within the system coverage area;
   an image scanning engine to search through and access image data from the one or more image data repositories in accordance with an image data query, selecting stored images and videos with geolocation tags indicating a location within a spatial distance of a location parameter of the image date query; and a query generator configured to generate an image data query to track a moving subject appearing in a previously selected image, wherein the image data query for tracking is based on an auto-predicted route of the subject derived from the previously selected image,
wherein the auto-predicted route is generated from at least the previously selected image, and includes spatiotemporal constraints corresponding to the predicted future route of the moving subject, and
wherein the image data query for a subset of images among the images in the one or more image data repositories, wherein the images of the subset match the spatiotemporal constrains of the predicted future route of the moving subject.

2. The system according to claim 1, wherein said image scanning engine searches through the one or more image data repositories also selecting stored images and videos whose time stamps are within a temporal distance from a time parameter of the image date query.

3. The system according to claim 1, further including a camera network gateway to provide said image scanning engine with access to live image feeds from one or more cameras within a camera network.

4. The system according to claim 3, wherein said camera network gateway provides said one or elements of said system with control over positioning and or orientation of one or more cameras of the camera network.

5. The system according to claim 3, further comprising at least one image feature extractor to identify and classify features appearing in image data, including objects and subjects, either retrieved from an image data repository or received from a camera feed.

6. The system according to claim 5, wherein extracted object features from given image data provided to an image scene localizer augment image data geotag information or camera position and orientation information for the given image data.

7. The system according to claim 5, wherein extracted subject features of a moving subject appearing within given image or video data is provided to a subject route predictor, wherein said predictor uses image extracted subject features such as subject type, subject direction and subject location to predicate a route or a possible future location of the moving subject at one or more future times.

8. The system according to claim 7, wherein said query generator configured to generate an image data query to track a moving subject appearing in a previously selected image is part of a subject localization and tracking engine which generates image queries, for both stored and camera feed images, wherein the generated image queries include location parameters and time parameters corresponding to one or more predicted routes for a specific subject.

9. The system according to claim 8, further including a subject identifier to specifically match a subject appearing across two or more images.

10. The system according to claim 9, further comprising a user interface to allow a user to designate a subject for tracking by marking the subject in previously selected image.

11. The system according to claim 10, wherein said user interface to allow a user to designate a class of subjects for tracking by identifying a specific subject within a previously selected image as an example of the subject type to be tracked.

12. The system according to claim 8, further comprising a user interface to allow a user to generate an image query for images of a specific subject or a specific class of subjects to be tracked by specifying one or more constraints selected from the group consisting of: (a) one or more base class identifiers, (b) one or more visual attributes, (c) location, (d) time range, (e) motion parameter, and (f) custom parameter.

13. A method for providing digital image data in which there appears a captured instance of a point of interest located within a coverage area of the system, said method comprising the steps of:
accessing one or more image data repositories which store digital image data of images and videos acquired from within the system coverage area;
searching through and accessing image data from one or more image data repositories in accordance with an image data query, selecting stored images and videos with geolocation tags indicating a location within a spatial distance of a location parameter of the image date query; and
generating an image data query to track a moving subject appearing in a previously selected image, wherein the image data query for tracking is based on an auto-predicted route of the subject derived from the previously selected image,
wherein the auto-predicted route is generated from at least the previously selected image, and includes spatiotemporal constraints corresponding to the predicted future route of the moving subject, and
wherein the image data query for a subset of images among the images in the one or more image data repositories, wherein the images of the subset match the spatiotemporal constrains of the predicted future route of the moving subject.

14. The method according to claim 13, wherein searching through the one or more image data repositories also selecting stored images and videos whose time stamps are within a temporal distance from a time parameter of the image date query.

15. The method according to claim 13, further including accessing live image feeds from one or more cameras within a camera network.

16. The method according to claim 15, wherein accessing live image feeds from one or more live image feeds includes providing control over positioning and or orientation of one or more cameras of the camera network.

17. The method according to claim 15, further comprising image feature extracting to identify and classify features appearing in image data, including objects and subjects, either retrieved from an image data repository or received from a camera feed.

18. The method according to claim 17, wherein extracted object features from given image data provided are image scene localized to augment image data geotag information or camera position and orientation information for the given image data.

19. The method according to claim 17, wherein extracted subject features of a moving subject appearing within given image or video data are used to predictor a future route or location of the moving subject, wherein prediction is based on features selected from the group consisting of subject type, subject direction and subject location at time of image capture.

20. The method according to claim 19, further including auto-generating an image data query to track a moving subject appearing in a previously selected image with location parameters and time parameters corresponding to one or more predicted routes for the moving subject.

21. The method according to claim 20, further including specifically matching a subject appearing across two or more images.

22. The method according to claim 21, further including designating a subject for tracking by marking the subject in previously selected image.

23. The method according to claim 22, further including designating a class of subjects for tracking by identifying a specific subject within a previously selected image as an example of the subject type to be tracked.

24. The method according to claim 20, further including generating an image query for images of a specific subject or a specific class of subjects to be tracked by specifying one or more constraints selected from the group consisting of: (a) one or more base class identifiers, (b) one or more visual attributes, (c) location, (d) time range, (e) motion parameter, and (f) custom parameter.

25. The method according to claim 13, wherein the spatiotemporal constraints include at least one selected from the group consisting of:
- an estimation of a direction and velocity of the moving subject at the time of the previously selected image,
- a factoring of traffic patterns at the time of the previously selected image,
- an estimation of a probability of a future trajectory of the moving subject from the location in the previously selected image,
- an estimation of a probability of a future location of the moving subject relative to a location in the previously selected image.

26. The system according to claim 1, wherein the spatiotemporal constraints include at least one selected from the group consisting of:
- an estimation of a direction and velocity of the moving subject at the time of the previously selected image,
- a factoring of traffic patterns at the time of the previously selected image,
- an estimation of a probability of a future trajectory of the moving subject from the location in the previously selected image,
- an estimation of a probability of a future location of the moving subject relative to a location in the previously selected image.

* * * * *